US011536601B2

United States Patent
Hirose et al.

(10) Patent No.: US 11,536,601 B2
(45) Date of Patent: Dec. 27, 2022

(54) LIQUID LEVEL DETECTOR

(71) Applicant: Yazaki Corporation, Tokyo (JP)

(72) Inventors: Ryo Hirose, Shizuoka (JP); Shintaro Nakajima, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/497,290

(22) Filed: Oct. 8, 2021

(65) Prior Publication Data

US 2022/0113180 A1    Apr. 14, 2022

(30) Foreign Application Priority Data

Oct. 12, 2020    (JP) .............................. JP2020-171903

(51) Int. Cl.
    *G01F 23/38*    (2006.01)
    *G01F 23/76*    (2006.01)
(52) U.S. Cl.
    CPC .............. *G01F 23/76* (2013.01); *G01F 23/38* (2013.01)

(58) Field of Classification Search
    CPC .......... G01F 23/76; G01F 23/38; G04F 23/38
    USPC ................... 73/317, 318, 319, 321, 313, 314
    See application file for complete search history.

(56) References Cited

FOREIGN PATENT DOCUMENTS

| JP | 2018-4540 A | 1/2018 |
| JP | 2018-205137 A | 12/2018 |
| WO | WO-2004106867 A1 * | 12/2004 ............. G01F 23/36 |
| WO | 2019065615 * | 4/2019 |

* cited by examiner

*Primary Examiner* — Robert R Raevis
(74) *Attorney, Agent, or Firm* — Sughrue Mion, PLLC

(57) ABSTRACT

A liquid level detector includes a frame, a float arm, a holder rotatably supported by the frame, a float arm mounting part configured to mount the float arm to the holder by elastically deforming a first part of the holder when mounting the float arm to the holder and restoring the first part when float arm is mounted to the holder, a float mounted to the float arm, and an elastic deformation preventing part configured to prevent elastic deformation of the first part of the float arm mounting part.

3 Claims, 13 Drawing Sheets

LIQUID LEVEL DETECTOR

CROSS-REFERENCE TO RELATED APPLICATIONS

The present application is based on, and claims priority from the prior Japanese Patent Application No. 2020-171903, filed on Oct. 12, 2020, the entire contents of which are incorporated herein by reference.

TECHNICAL FIELD

The present disclosure relates to a liquid level detector.

BACKGROUND

Conventionally, a fuel level sensor (or a liquid level detector) including a frame incorporating a Hall integrated circuit (Hall IC), a holder incorporating a magnet and rotatably supported by the frame, a float arm, and a float is known (see JP 2018-205137 A).

In a conventional liquid level detector, a base end of a float arm is mounted at a float arm mounting part of a holder, a tip end side part of the float arm is extended from the holder, and a float is provided at a tip end part of the float arm.

In the conventional liquid level detector, due to a buoyancy that the float received from liquid fuel, the holder rotates with respect to the frame, and a liquid level of the fuel (a level of liquid surface) is detected.

In the conventional liquid level detector, the float arm is mounted on the holder by using a snap-fit system. That is, when mounting the float arm onto the holder, a part of the float arm mounting part elastically deforms. The part of the float arm mounting part restores when the float arm is mounted on the holder, and accordingly the float arm is mounted on the holder.

SUMMARY

By the way, in the conventional liquid level detector, the float arm does not come off from the holder in a normal use state in which the liquid level of the fuel is detected.

However, in an emergency condition in which the float arm or the float is struck against the fuel tank while mounting the conventional liquid level detector into the fuel tank, a force of an unexpected magnitude may be applied to the float arm mounting part.

In such an emergency condition, a part of the float arm mounting part may be deformed, and the float arm may come off from the float arm mounting part. In order to prevent the float arm from coming off from the float arm mounting part, it is conceivable to increase the strength of the float arm mounting part or add a component for preventing deformation of the float arm mounting part.

However, if the strength of the float arm mounting part is increased, the liquid level detector may become larger, and the mountability of the float arm to the holder may deteriorate due to an increase in the insertion load. In addition, if components for preventing deformation of the float arm mounting part are added, a number of components configuring the liquid level detector increases.

An object of the present disclosure is to provide a liquid level detector that improves holding strength of a float arm by a holder while preventing enlargement of the device, deterioration of assembly ease of the float arm to the holder, and increase in the number of components of the device.

A liquid level detector according to some embodiments includes a frame, a float arm, a holder rotatably supported by the frame, a float arm mounting part provided on the holder and configured to mount the float arm to the holder by elastically deforming a first part of the holder when mounting the float arm to the holder and restoring the first part when float arm is mounted to the holder, a float mounted to the float arm to be apart from the holder, and an elastic-deformation-preventing part formed on the frame and configured to prevent elastic deformation of the first part of the float arm mounting part.

The elastic-deformation-preventing part may be configured to prevent elastic deformation of the first part of the float arm mounting part when the rotation angle of the holder with respect to the frame is within a predetermined rotation angle range.

The predetermined rotation angle range may be a rotation angle range excluding a mountable rotation angle range for the float arm onto the holder.

The above described configuration provides a liquid level detector that can improve the holding strength of a float arm by a holder while preventing the device from becoming larger, the mountability of the float arm to the holder from deteriorating, and the number of components of the device from increasing.

BRIEF DESCRIPTION OF THE DRAWINGS

FIG. 12 is a view illustrating a state in which the holder is rotated clockwise by a predetermined angle from the state illustrated in FIG. 11;

DETAILED DESCRIPTION

Figure 1:
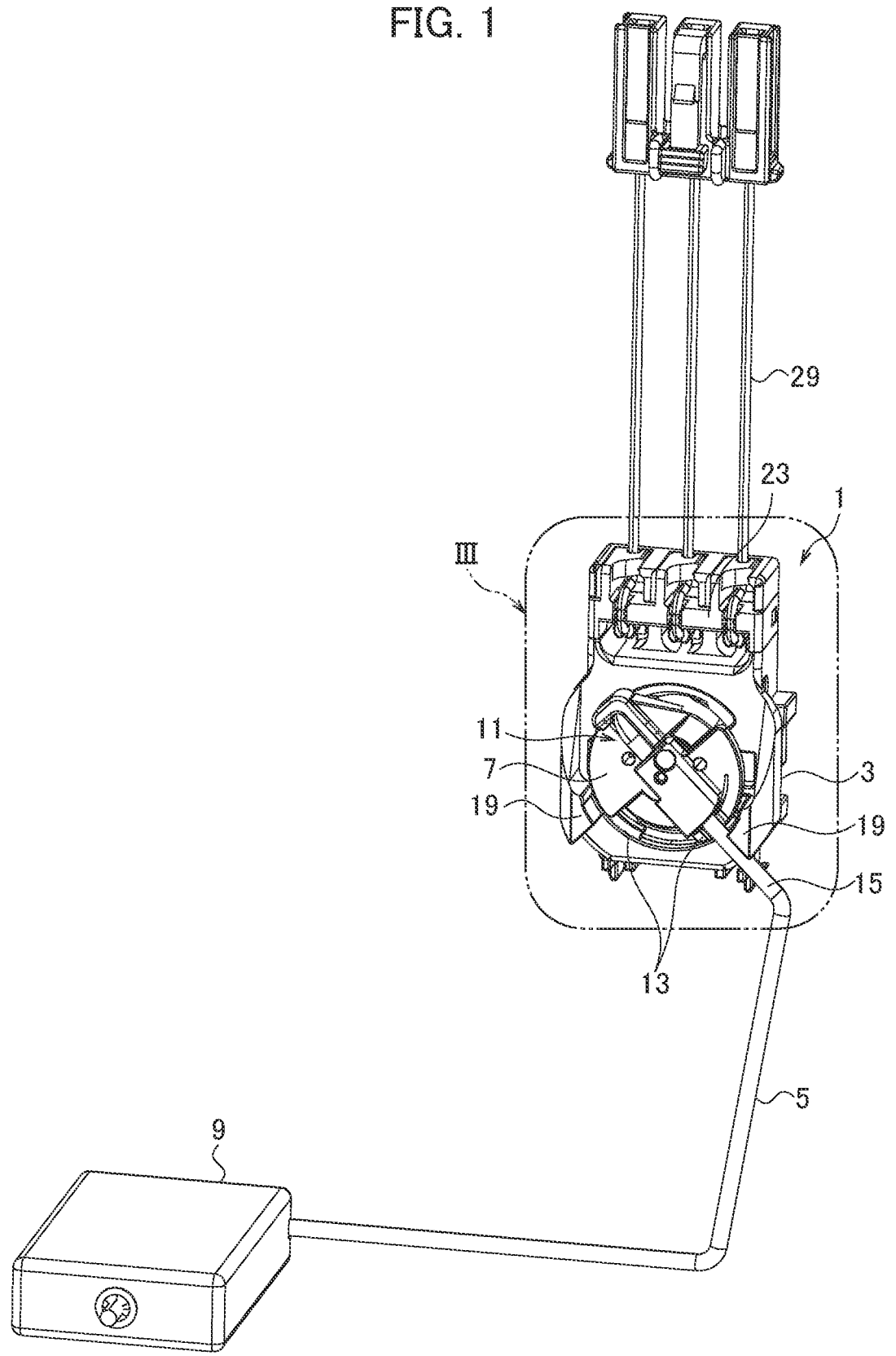
FIG. 1 is a perspective view of a liquid level detector according to some embodiments.

Various embodiments will be described hereinafter with reference to the accompanying drawings.

A liquid level detector (liquid level sensor) 1 according to embodiments of this disclosure is a liquid level detector configured to be installed in a fuel tank of a vehicle (not illustrated), for example, as illustrated in FIGS. 1 to 4, and configured to detect a height position of liquid surface (liquid level) of a fuel in the fuel tank.

The liquid level detector 1 comprises a frame (housing) 3, a float arm 5, a holder (rotating member) 7, and a float 9. The holder 7 is rotatably supported (mounted) on the frame 3. The holder 7 is provided with a float arm mounting part 11 where the float arm 5 is mounted.

The first part of the float arm mounting part 11 is configured to elastically deform when mounting the float arm 5 onto the holder 7 (the float arm mounting part 11). The first part (the part to be elastically deformed) of the float arm mounting part 11 restores when the float arm 5 is mounted to the holder 7. Thus, the holder 7 is configured to so as the float arm 5 to be mounted to the float arm mounting part 11. The float 9 is mounted at a tip of the float arm 5 apart from the holder 7.

The base end part of the float arm 5 is mounted to the float arm mounting part 11. In a state wherein the float arm 5 is mounted onto the float arm mounting part 11 of the holder 7, the holder 7 and the float arm 5 are integrated, and configured to rotate the float arm 5 together with the holder when the holder 7 is rotated with respect to the frame 3.

In a state wherein the float arm 5 is mounted onto the float arm mounting part 11 of the holder 7, a part on a tip side of the float arm 5 extends long from the holder 7. The float 9 is mounted to the float arm 5 at the tip of the tip side of the float arm 5 extended from the holder 7.

The frame 3 of the liquid level detector 1 is provided with an elastic deformation preventing part 13. The elastic deformation preventing part 13 prevents the float arm 5 mounted to the holder 7 from coming off from the holder 7. The elastic deformation preventing part 13 prevents elastic deformation of the first part (the aforementioned elastically deformable part) of the float arm mounting part 11. That is, in the frame 3, elastic deformation that causes the float arm 5 mounted to the float arm mounting part 11 to detach from the float arm mounting part 11 is prevented by the elastic deformation preventing part 13.

Figure 2:
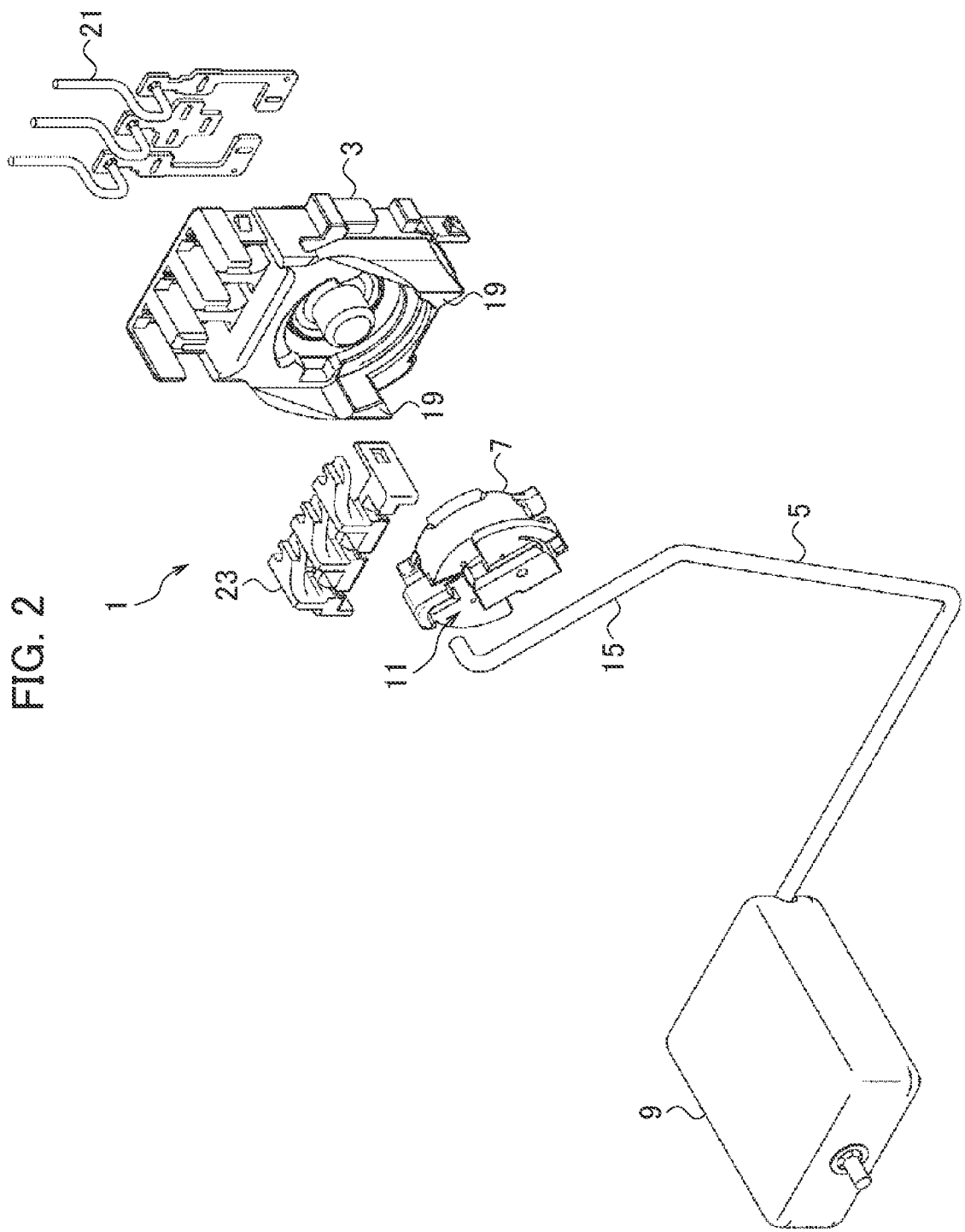
FIG. 2 is an exploded perspective view of the liquid level detector of FIG. 1 according to some embodiments.
Figure 3:
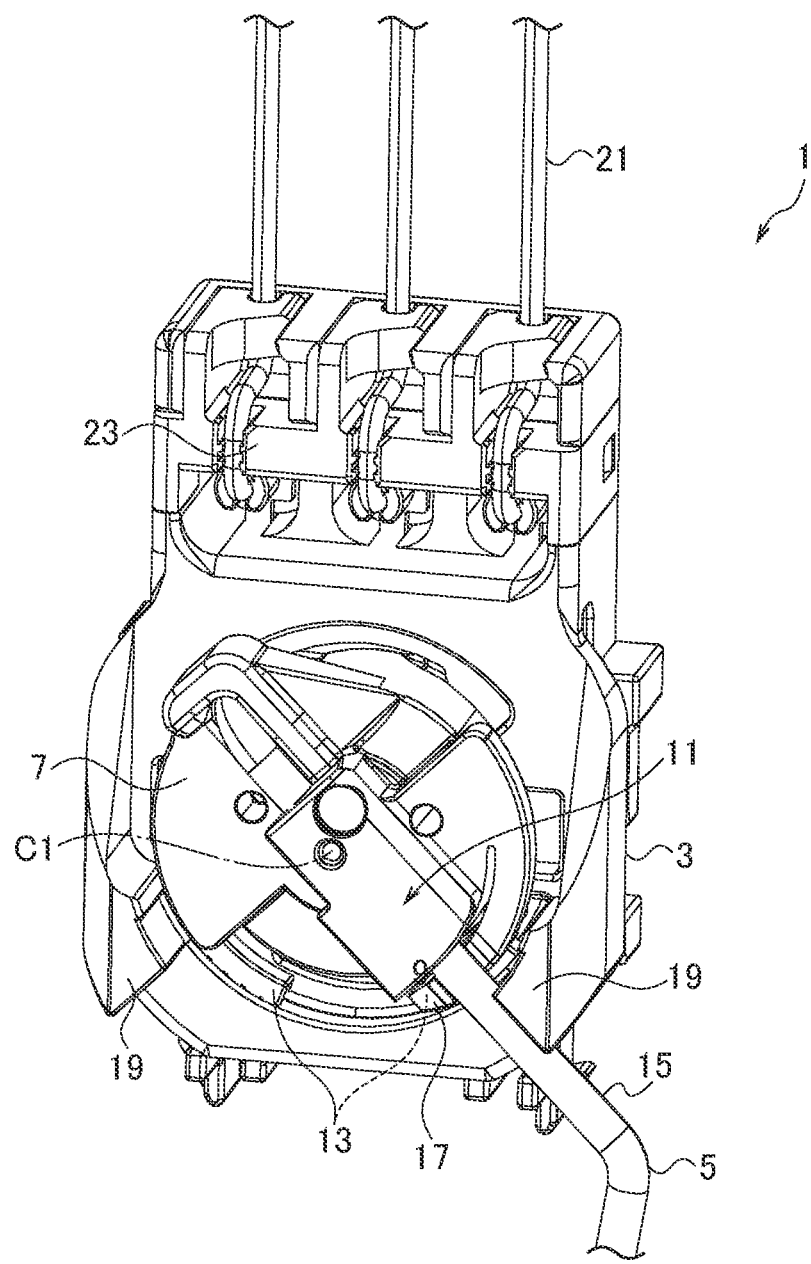
FIG. 3 is an enlarged view of part III of FIG. 1.
Figure 5:
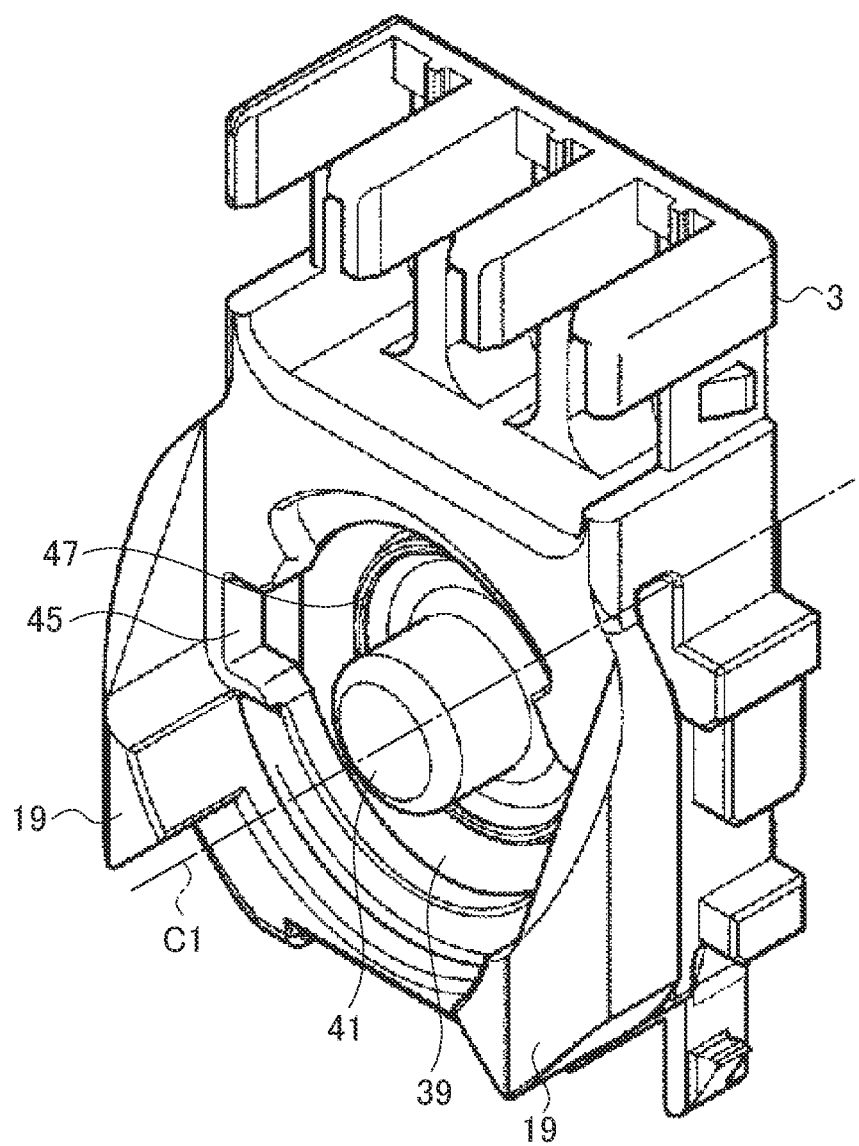
FIG. 5 is a perspective view of a frame of the liquid level detector of FIG. 1 according to some embodiments.

In a state the holder 7 is not mounted on the frame 3, the elastic deformation preventing part 13 does not exhibit this function even if the float arm 5 is mounted on the holder 7. In FIGS. 2 and 5, the display of the elastic deformation preventing part 13 is omitted.

In the liquid level detector 1, the holder 7 rotates with respect to the frame 3 due to a buoyancy of the float 9 received from a liquid (fuel). The liquid level is detected by detecting the rotation angle of the holder 7 with respect to the frame 3.

The rotation angle of the holder 7 with respect to the frame 3 is detected, for example, by using a magnet (not illustrated) provided on the holder 7 and a Hall element (not illustrated) provided on the frame 3 for detecting the displacement of the magnet.

The elastic deformation preventing part 13 is configured to prevent elastic deformation of the first part of the float arm mounting part 11 only when the rotation angle of the holder 7 with respect to the frame 3 is within a predetermined rotation angle range.

Figure 6:
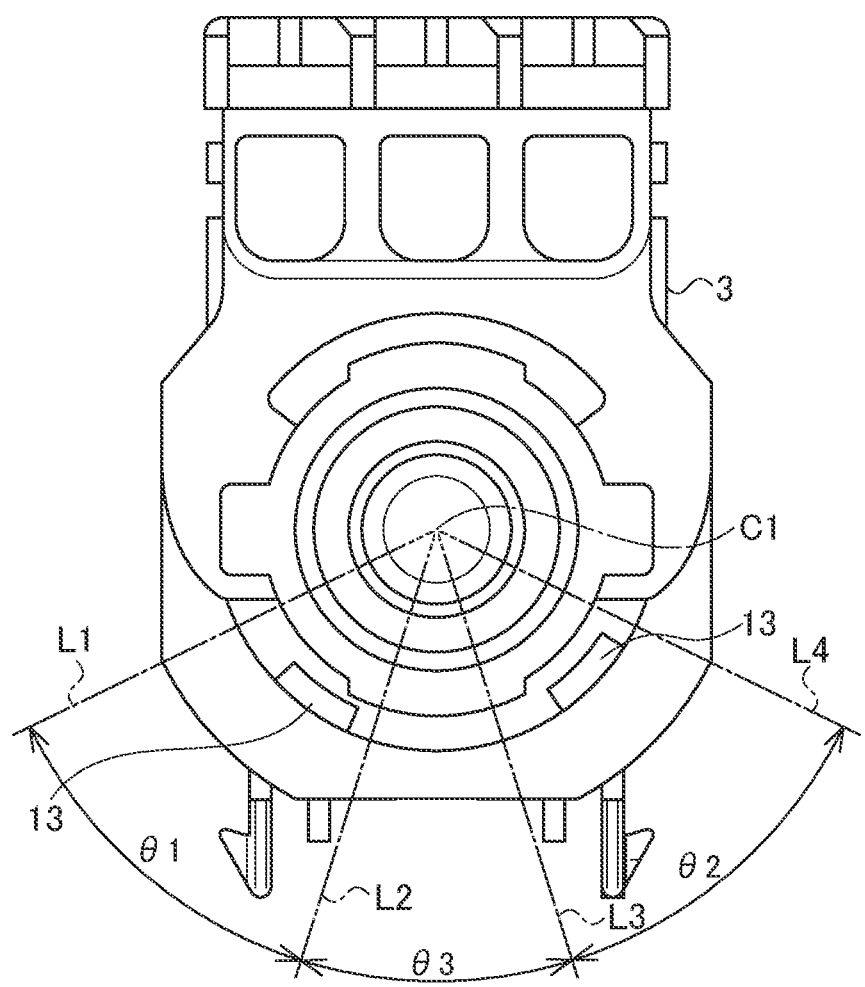
FIG. 6 is a front view of a frame of the liquid level detector of FIG. 1 according to some embodiments.

More specifically, when the rotation angle of the holder 7 (float arm 5) is within the angle range indicated by reference $\theta1$ in FIG. 6, the elastic deformation preventing part 13 exhibits this function. When the rotation angle of the holder 7 (the float arm 5) is within the angle range indicated by reference $\theta2$ in FIG. 6, the elastic deformation preventing part 13 also exhibits this function.

On the other hand, when the rotation angle of the holder 7 (float arm 5) is within the angle range indicated by reference $\theta3$ in FIG. 6, the elastic deformation preventing part 13 does not exhibit this function.

Each of the linear dashed-and-dotted lines L1, L2, L3 and L4 illustrated in FIG. 6 indicates a virtual position of a center axis of a holder adjacent part 15 of the float arm 5 shaped in a rod-shape when the float arm 5 rotates. The holder adjacent part 15 of the float arm 5 extends in a short linear shape from the holder 7 in a vicinity of the holder 7. The dashed-and-dotted lines L1, L2, L3 and L4 pass through a rotation center axis C1 of the holder 7 (float arm 5) with respect to the frame 3.

The holder 7 rotates with respect to the frame 3 between the dashed-and-dotted lines L1 and L4. That is, the holder 7 rotates counterclockwise from the dashed-and-dotted line L1 to the dashed-and-dotted line L4 via the dashed-and-dotted lines L2 and L3 (the rotation angle range indicated by $\theta1$, $\theta2$ and $\theta3$ in FIG. 6). The elastic deformation preventing part 13 on the frame 3 is not arranged at the rotation angle range indicated by $\theta3$.

The rotation range of the holder 7 with respect to the frame 3 is limited by a pair of stoppers 19 (See FIGS. 1 and 3) formed integrally with the frame 3. Between the dashed-and-dotted lines L1 and L4, the holder 7 rotates with respect to the frame 3. More specifically, the rotation range of the holder 7 (float arm 5) is limited by the abutment of the holder adjacent part 15 of the float arm 5 on each of the pair of stoppers 19.

The predetermined rotation angle range $\theta1$ and $\theta2$ at which the elastic deformation preventing part 13 exhibits this function is a rotation angle range excluding a mountable rotation angle range $\theta3$ for the float arm 5 onto the float arm mounting part 11 of the holder 7, the holder being mounted on the frame 3. The mountable rotation angle range $\theta3$ for the float arm 5 onto the float arm mounting part 11 may be set to a minimum necessary rotation angle range, for example. That is, in the liquid level detector 1, a predetermined rotation angle range for preventing elastic deformation of the first part of the float arm mounting part 11 is a rotation angle range $\theta1$ or $\theta2$ excluding the rotation angle range $\theta3$ when the float arm 5 is mounted on the holder 7.

In FIG. 6, the mountable rotation angle range $\theta3$ is illustrated in an angle range of about 30°. If, for example, the minimum necessary rotation angle range for mounting the float arm 5 onto the holder 7 mounted on the frame 3 is smaller than 30°, the angle range $\theta3$ may be narrower than that illustrated in FIG. 6. For example, in some embodiments, the angle range $\theta3$ may be narrowed to an angle range of about 10°. In such a case, for example, at least one of the angle range $\theta1$ or the angle range $\theta2$ is expanded to the angle range $\theta3$ side.

Figure 11:
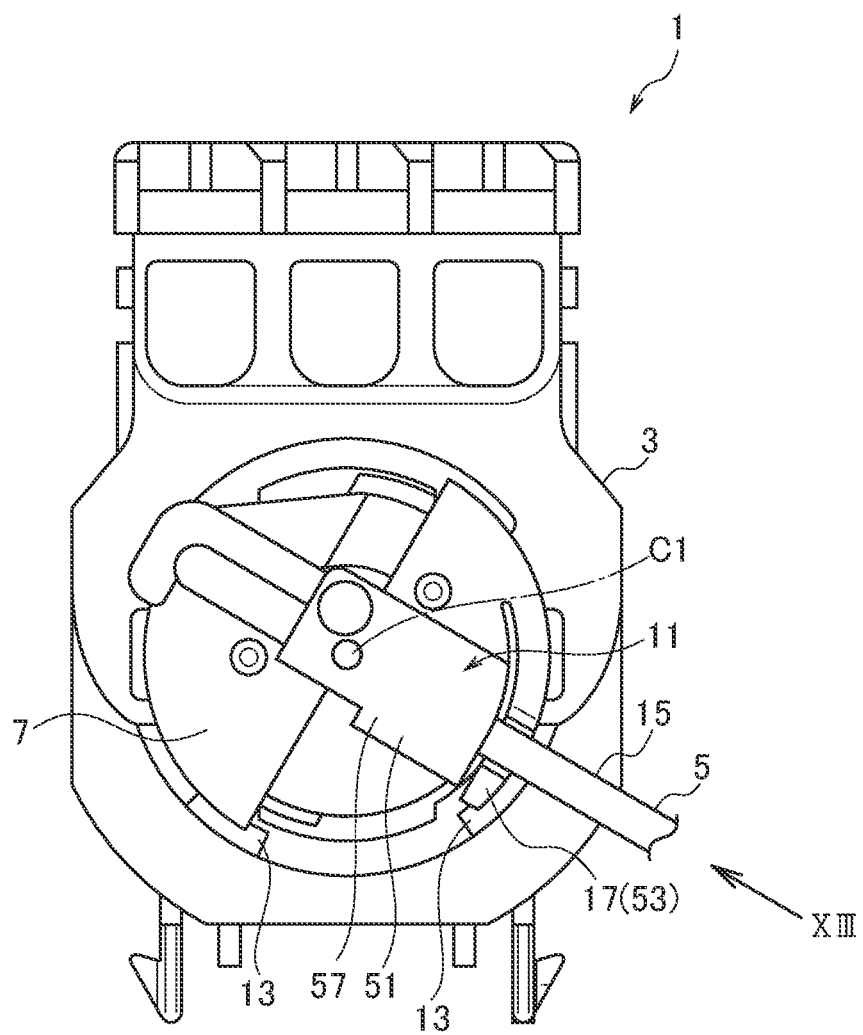
FIG. 11 is a front view of the liquid level detector of FIG. 1 according to some embodiments.
Figure 13:
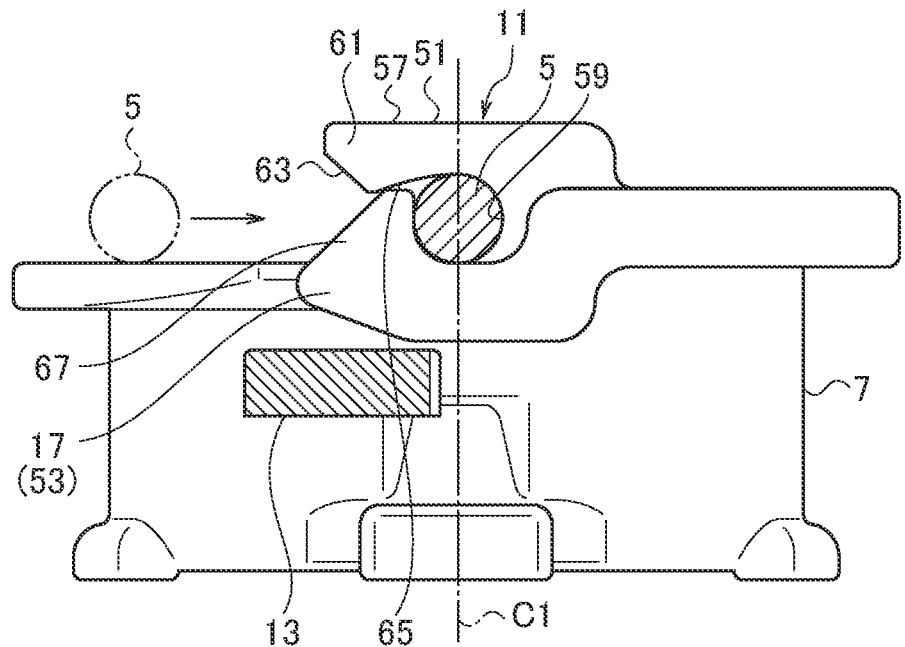
FIG. 13 is an arrow XIII view of FIG. 11.
Figure 14:
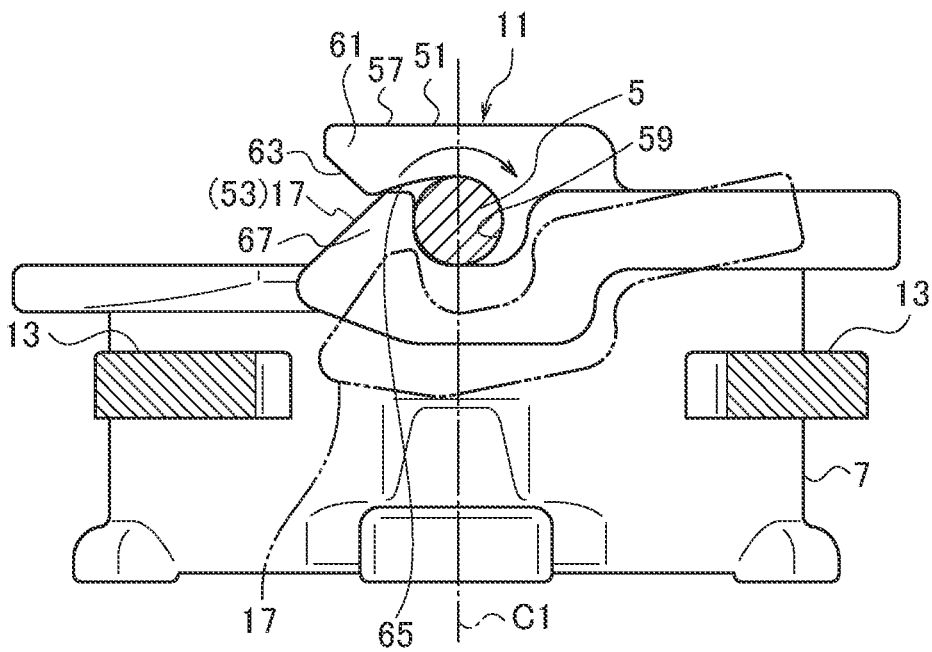
FIG. 14 is an arrow XIV view of FIG. 12.

The predetermined rotation angle at which the elastic deformation preventing part 13 performs the function may be within the rotation angle range when the frame 3 (or the liquid level detector 1) is assembled to the tank (fuel tank) in which the liquid (fuel) to be detected is stored. For example, the liquid level detector 1 is installed into the fuel tank in a state illustrated in FIG. 1. In FIG. 1, the rotation angle of the holder 7 or the float arm 5 with respect to the frame 3 is the rotation angle indicated by the dashed-and-dotted line L4 in FIG. 6, that is, the state illustrated in FIGS. 11 and 13. In the state illustrated in FIG. 1, the tip of the float arm 5 may interferes with a wall, contents, and the like of the fuel tank and a repulsive force may exerted on the float arm 5. In FIG. 13, only the elastic deformation preventing part 13 is displayed, and the parts of the frame 3 other than the elastic deformation preventing part 13 are not illustrated. In FIG. 14, similarly, only the elastic deformation preventing part 13 is illustrated.

More specifically, as illustrated in FIG. 13, the float arm 5 is claw-fitted to the holder 7 from the left side by a snap fit, and is installed in the float arm mounting part 11. That is, the float arm 5 is moved to the right side with respect to the holder 7 as indicated by an arrow from a position indicated by a dashed and double-dotted line and is mounted on the holder 7. Even if the float arm 5 is moved to the right side as indicated by the arrow in the state illustrated in FIG. 13, the elastic deformation preventing part 13 prevents the elastic deformation of the snap-fit claw 17. Therefore, in the state illustrated in FIG. 13, the float arm 5 cannot be mounted to the float arm mounting part 11. When mounting the float arm 5 to the float arm mounting part 11, the holder 7 is rotated to the angle range θ3 illustrated in FIG. 6 with respect to the frame 3, and is set to the state illustrated in FIG. 14.

After the float arm 5 is mounted on the holder 7, the holder 7 (or float arm 5) is freely rotates with respect to the frame 3 in a range between the dashed-and-dotted line L1 and the dashed-and-dotted line L4 illustrated in FIG. 6.

Note that the snap-fit claw 17 of the float arm mounting part 11 illustrated in FIG. 13 elastically deforms to a position illustrated by a dashed-and-double dotted line in FIG. 14 when mounting the float arm 5 onto the holder 7.

As illustrated by an arrow in FIG. 14, when a force (rotational moment) is applied in a direction in which the float arm 5 is twisted to the right in a state in which the float arm 5 is mounted on the holder 7, the float arm 5 may be detached from the float arm mounting part 11 (fitting part). That is, when the rotational moment indicated by the arrow is applied, the snap-fit claw 17 is elastically deformed as indicated by the dashed-and-double dotted line in FIG. 14, and the float arm 5 may be detached from the float arm mounting part 11 (fitting portion).

The frame 3 is provided with a projecting part (elastic deformation preventing part) 13 for regulating the deflection of the snap-fit claw 17 of the holder 7. Even when the rotation moment illustrated by the arrow in FIG. 14 is applied to the float arm 5, if, for example, the front arm 5 is rotated to the angle range θ1 or θ2 illustrated in FIG. 6 as illustrated in FIG. 13, the elastic deformation of the snap-fit claw 17 is prevented by the elastic deformation preventing part 13.

Figure 12:
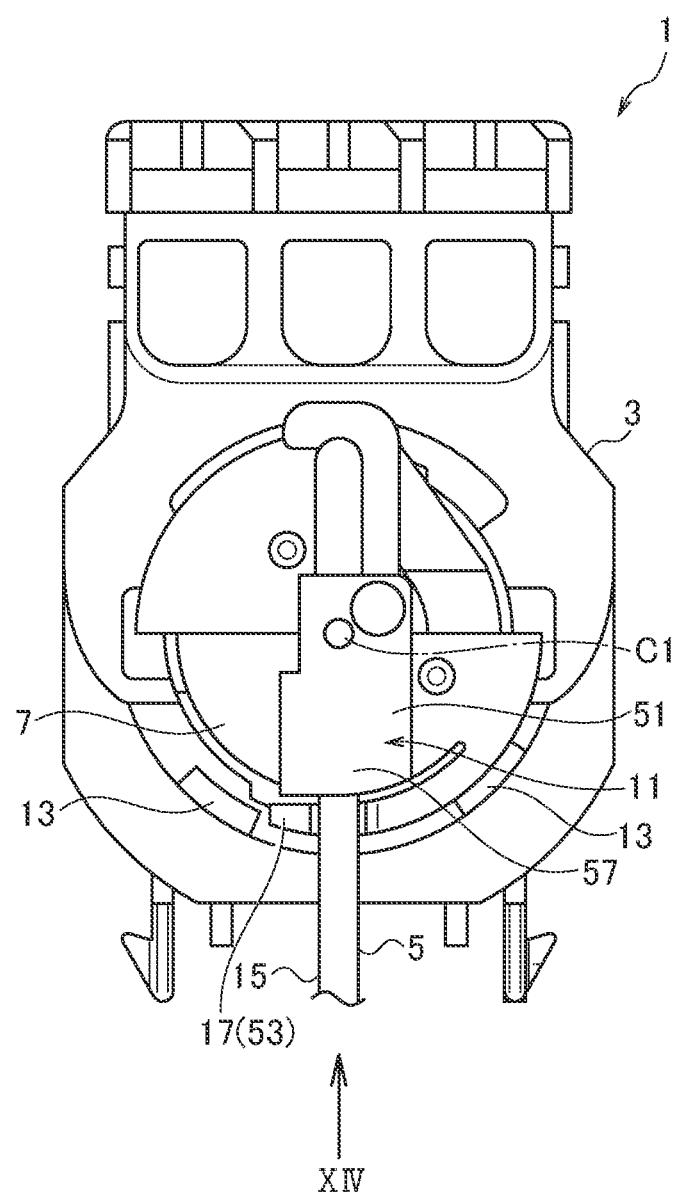
FIG. 12 is a front view of the liquid level detector of FIG. 1 according to some embodiments.

FIGS. 12 and 14 illustrates a state in which the float arm 5 is positioned within the range of the angle θ3 (for example, the center) illustrated in FIG. 6. In this state, the snap-fit claw 17 undergoes elastic deformation as indicated by the dashed-and-double dotted line in FIG. 14. On the other hand, in FIG. 13, the float arm 5 is rotated as illustrated by the dashed-and-dotted line L4 in FIG. 6, and the snap-fit claw 17 abuts against the elastic deformation preventing part 13, thereby preventing the elastic deformation of the snap-fit claw 17.

Figure 4:
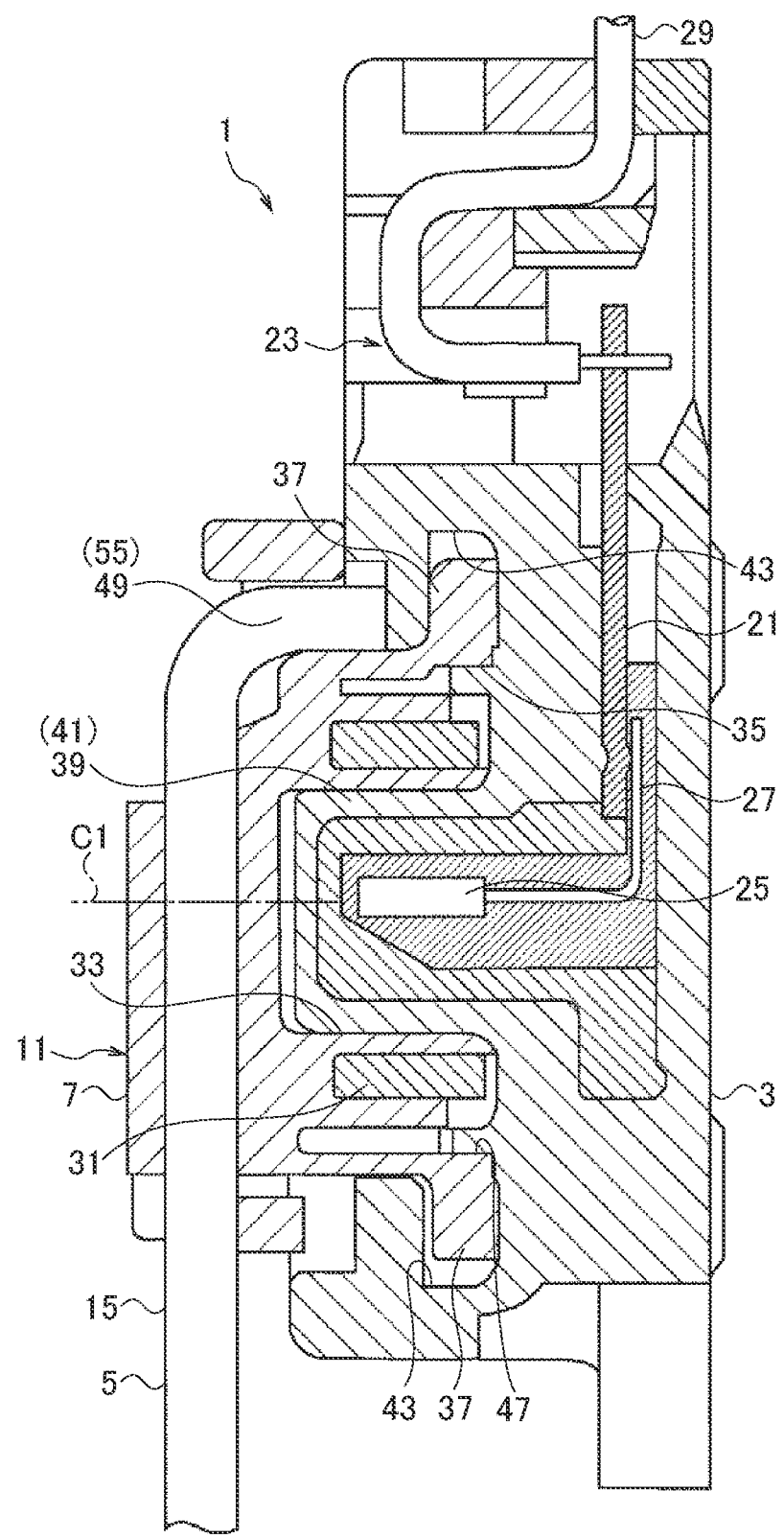
FIG. 4 is a cross-sectional view of the liquid level detector of FIG. 1 according to some embodiments.

The liquid level detector 1 will be further described. As illustrated in FIG. 2 and the like, the liquid level detector 1 is provided with a terminal 21 and a holding member 23. The terminal 21 and the holding member 23 are assembled to the frame 3, respectively. As illustrated in FIG. 4, a lead 27 of a Hall element 25 provided inside the frame 3 is electrically connected to the terminal 21. A detection line 29 held by the holding member 23 is connected to the terminal 21, and the detection line 29 is drawn out from the upper part of the frame 3.

As illustrated in FIG. 1 and the like, the base end of the float arm 5 is connected to the holder 7. The other end of the float arm 5 is a free end, and the float 9 is fixed to the free end. As illustrated in FIGS. 2 and 4, the holder 7 is formed in a circular shape (a low cylindrical shape) having a magnet 31 therein, the magnet 31 formed in an annular-shape. The holder 7 is mounted on the front side of the frame 3 and rotatably supported.

As illustrated in FIG. 4, the holder 7 has a shaft-receiving recess 33 at a central portion on the rear surface side. The magnet 31 is arranged on the inner peripheral side of the shaft-receiving recess 33. A guide recess 35 is formed on the outer peripheral side of the magnet 31 on the rear surface side of the holder 7. Further, the holder 7 has a pair of flanges 37 at an edge on the rear surface side. These flanges 37 are disposed at upper and lower positions of the holder 7 and protrude outward in the radial direction.

As described above, in the liquid level detector 1, the float arm 5 swings with the movement of the float 9 that follows the liquid surface, and the holder 7 to which the float arm 5 is connected rotates with respect to the frame 3. Then, the Hall element 25 in the frame 3 detects a change in the magnetic flux of the magnet 31 of the holder 7, and the detection result is transmitted to the measuring unit (not illustrated) via the detection line 29. The measuring unit measures the liquid level on the basis of the detection result from the Hall element 25 and issue an alert if necessary. For example, the measuring unit alerts a fuel shortage in the fuel tank.

As illustrated in FIGS. 5 and 6, the frame 3 has, on its front surface side, a rotatably-accommodating recess 39 in which the holder 7 is rotatably accommodated. The rotatably-accommodating recess 39 is formed in a circular shape in a front view. A shaft 41 is projectingly provided on the rotation center axis C1 of the rotatably-accommodating recess 39, and the Hall element 25 is provided in the shaft 41.

As illustrated in FIGS. 4 and 5, in the frame 3, a locking groove 43 is formed in the inner peripheral part of the rotatably-accommodating recess 39 in a circumferential direction. On the front surface side of the frame 3, a pair of insertion holes 45 are formed at opposite positions in the edge part of the rotatably-accommodating recess 39. These insertion holes 45 are formed at left and right positions sandwiching the rotatably-accommodating recess 39 in the frame 3, and each of the insertion holes 45 communicates with the locking grooves 43. At the bottom of the rotatably-accommodating recess 39, a guide protrusion 47 is formed along the circumferential direction so as to surround the shaft 41.

Figure 7A:
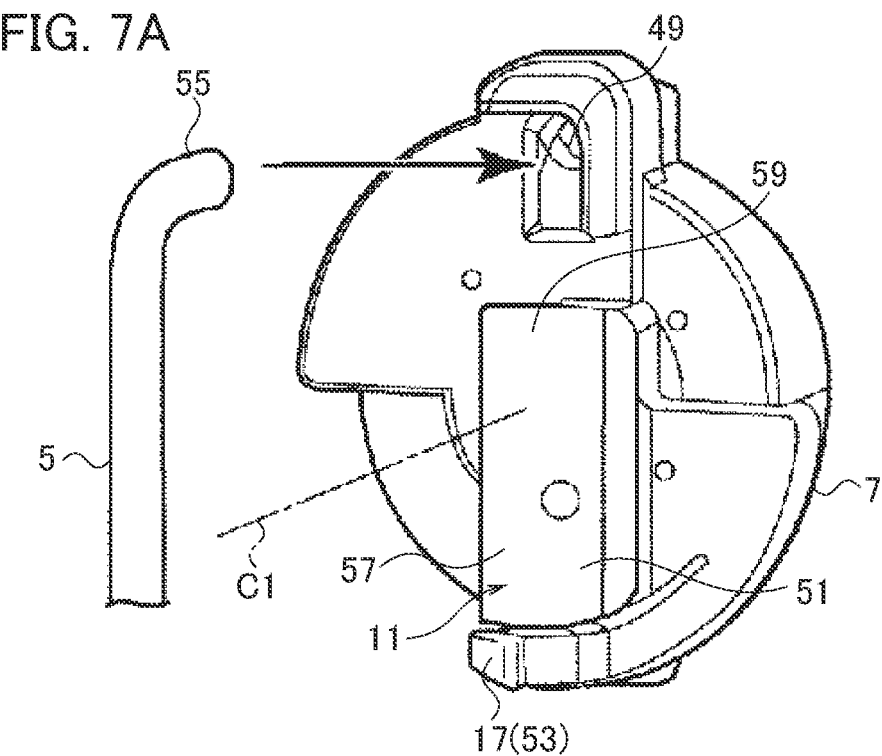
FIG. 7A is a perspective view of a holder and a float arm of the liquid level detector of FIG. 1 according to some embodiments, illustrating a state prior to mounting of the float arm.
Figure 7B:
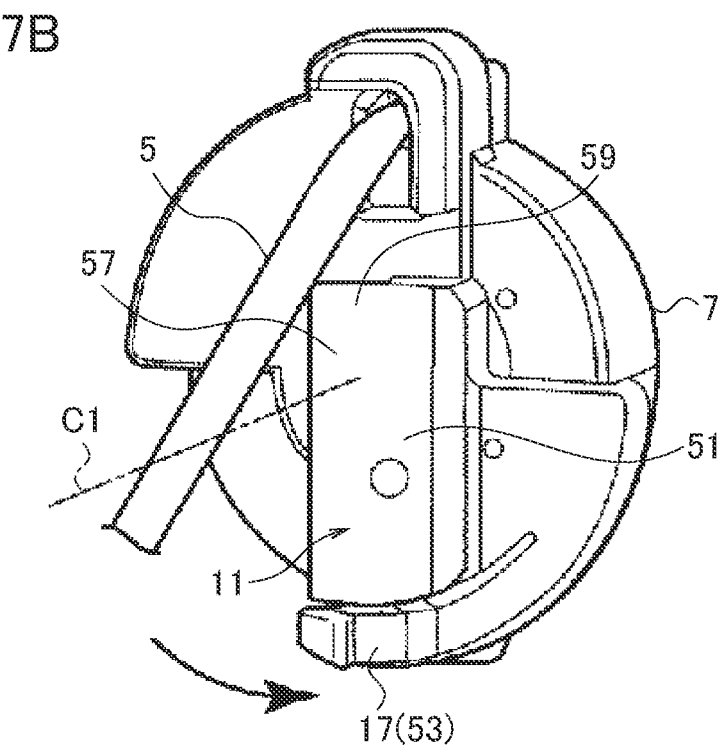
FIG. 7B is a perspective view of a holder and a float arm of the liquid level detector of FIG. 1 according to some embodiments, illustrating a state of the float arm during mounting.

As illustrated in FIGS. 7A and 7B, the holder 7 is provided with a float arm mounting part (arm fixing part) 11. The float arm 5 is fixed to the holder 7 by a float arm mounting part 11. A float arm 5 fixed to the holder 7 passes (or crosses) the rotation center axis C1 of the holder 7. The rod-shaped float arm 5 fixed to the holder 7 extends in a direction perpendicular to the rotation center axis C1.

The float arm mounting part 11 has a lock hole 49, a holding part 51 and a locking part 53. The lock hole 49 is formed of a hole part penetrating from the front side to back side of the holder 7, and is formed in a part of a peripheral edge part of the holder 7. The base end, which is one end of the float arm 5, is a lock end 55 bent at a right angle. The lock end 55 is inserted into the lock hole 49.

Figure 8A:
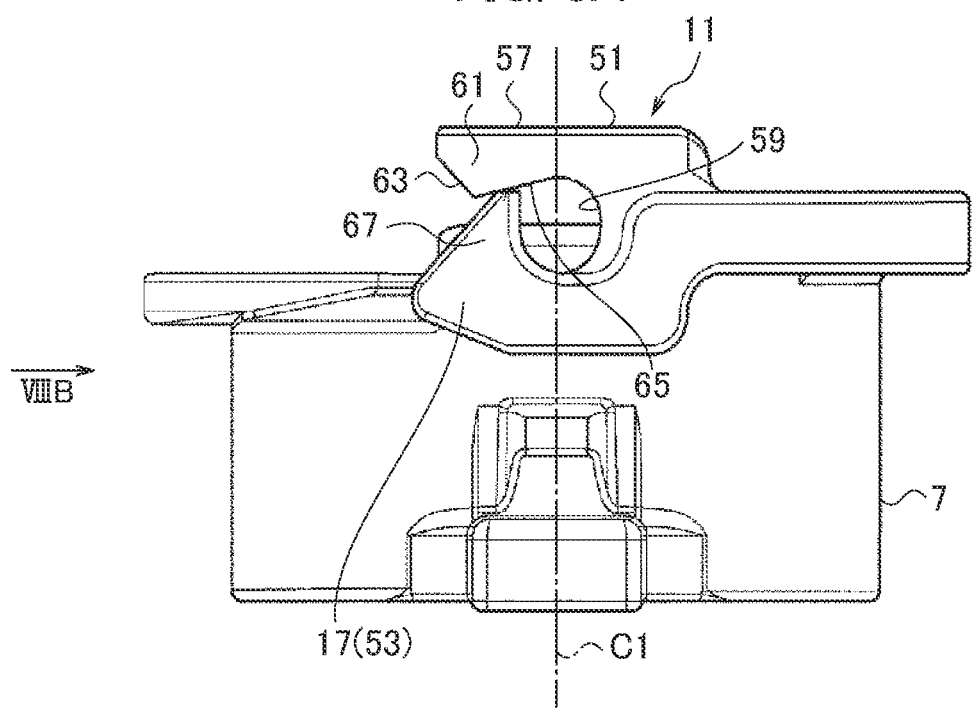
FIG. 8A is a bottom view illustrating a structure of a holder of the liquid level detector of FIG. 1 according to some embodiments.
Figure 8B:
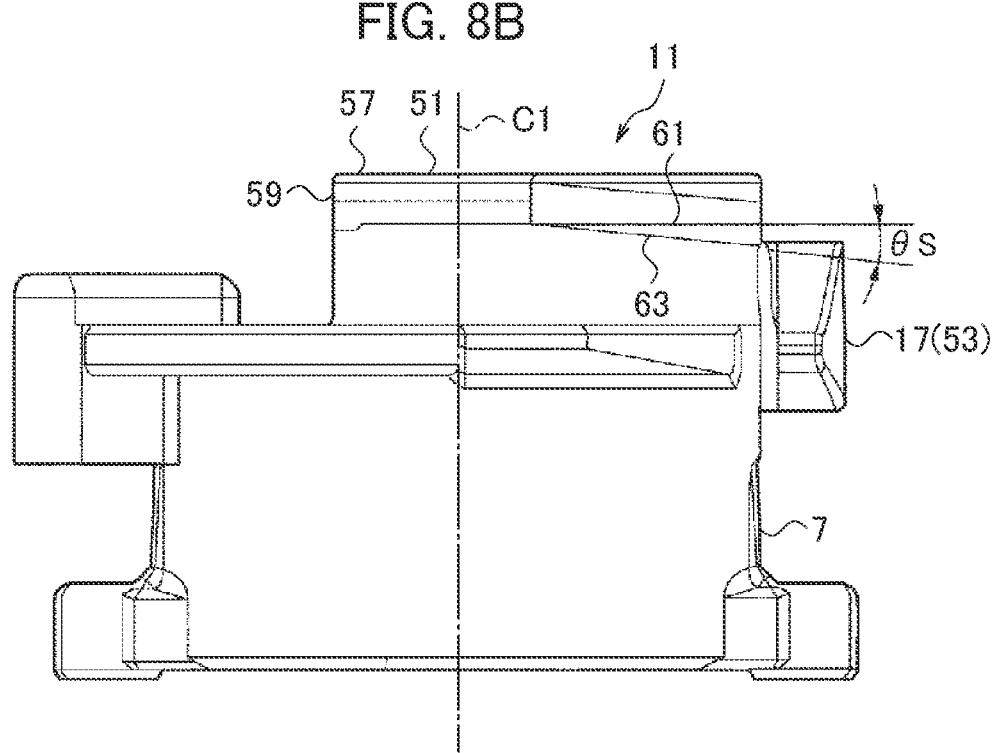
FIG. 8B is a side view (as viewed by arrows VIIIB in FIG. 8A) illustrating a structure of a holder of the liquid level detector according to some embodiments.

As illustrated in FIGS. 8A and 8B, the holding part 51 is formed on the front surface side of the holder 7. The holding part 51 has a holding piece 57 projecting sideways. A holding groove 59 is formed between the holding piece 57 and the front surface of the holder 7. A part near the base end of the float arm 5 is fitted into the holding groove 59 from the sideways.

A holding projection 61 projecting to the surface side of the holder 7 is formed on an edge part of the holding piece 57 of the holding part 51. The holding projection 61 is formed on the tip side of the float arm 5 with respect to the rotation center axis C1 of the holder 7. The amount of projection of the holding projection 61 is gradually increased as a distance from the lock hole 49 is increased. Thus, a tip part of the holding projection 61 of the holding piece 57 is inclined at an inclination angle θs toward the tip side of the float arm 5 with respect to the inner surface of the holder 7 side of the holding piece 57 in a side view illustrated in FIG. 8B.

The holding projection 61 has a guide surface 63 on the opening side of the holding groove 59 and a holding surface 65 on an inner side of the holding groove 59. The guide surface 63 is an inclined surface gradually inclined to the surface of the holder 7 toward the front side in the insertion direction of the float arm 5 into the holding groove 59. The holding surface 65 is an inclined surface which gradually inclines toward the surface side of the holder 7 toward the opening side of the holding groove 59 which is the rear side in the insertion direction of the float arm 5 into the holding groove 59.

The locking part 53 is formed on a side opposite to the lock hole 49 in the holding part 51. The locking part 53 has a claw part 67 projecting to the front side of the holder 7. The claw part 67 locks the peripheral surface of the float arm 5 fitted in the holding groove 59 of the holding part 51. The locking part 53 has a cantilever flexible arm structure connected to a part of an edge of the holder 7 and extending along the edge of the holder 7 (See FIGS. 7A and 7B). Thus, the locking part 53 is easily elastically deformed to easily displace the claw part 67. The locking part 53 and the claw part 67 constitute the snap-fit claw 17.

In order to assemble the holder 7 to the frame 3, the holder 7 is fitted into the rotatably-accommodating recess 39 by aligning the flange 37 of the holder 7 to the position of the insertion hole 45 of the frame 3. In this way, the flange 37 is inserted into the insertion hole 45, and the shaft 41 of the frame 3 is inserted into the shaft-receiving recess 33 of the holder 7. The guide protrusion 47 of the frame 3 enters the guide recess 35 of the holder 7.

Next, the holder 7 fitted in the rotatably-accommodating recess 39 is rotated so as the lock hole 49 to be arranged upward. In this way, the flange 37 of the holder 7 enters the locking groove 43 of the frame 3, and the holder 7 is prevented from coming off from the rotatably-accommodating recess 39 of the frame 3.

In order to assemble the float arm 5 to the holder 7, as illustrated in FIG. 7A, the lock end 55 formed at the base end of the float arm 5 is inserted into the lock hole 49 of the holder 7.

Figure 9A:
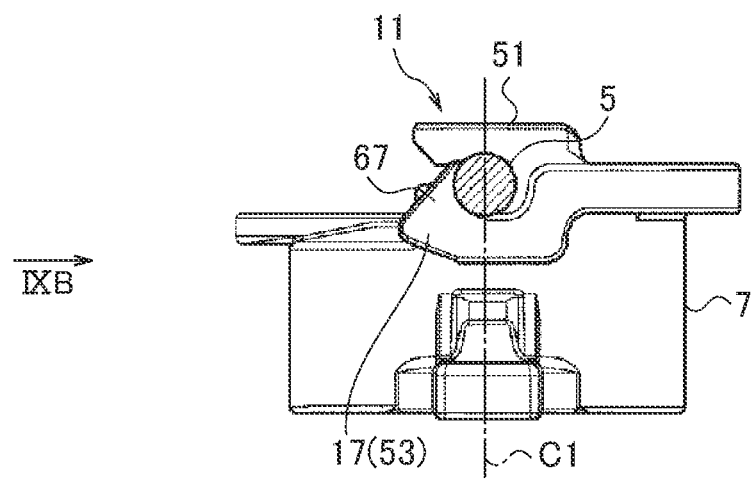
FIG. 9A is a bottom view of a holder with a float arm mounted thereto in the liquid level detector of FIG. 1 according to some embodiments.
Figure 9B:
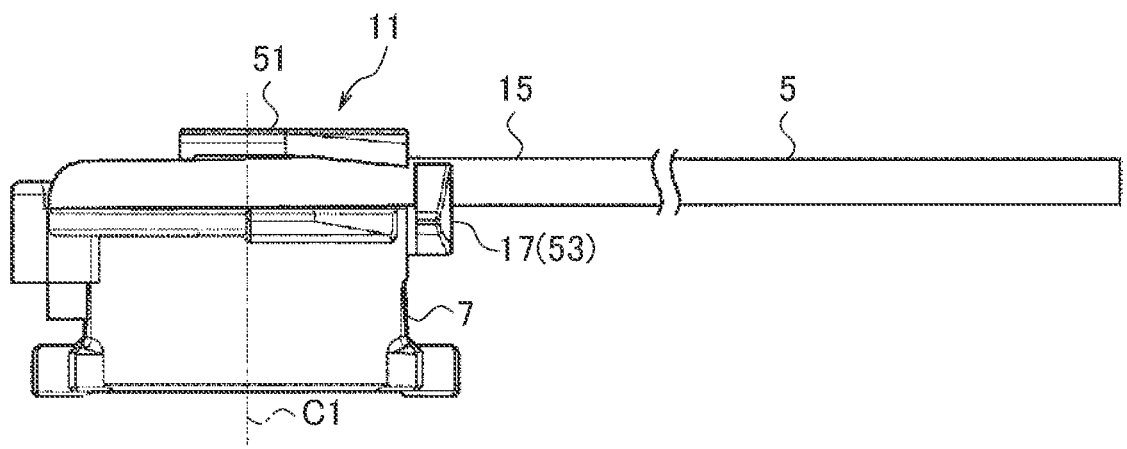
FIG. 9B is a side view (view taken along the arrow IXB in FIG. 9A) illustrating a holder with a float arm mounted thereto in the liquid level detector of FIG. 1 according to some embodiments.

Next, as illustrated in FIG. 7B, the float arm 5 is rotated with the lock end 55 inserted into the lock hole 49 as a fulcrum. Then, a base end portion of the float arm 5 is fitted into the holding groove 59 of the holding part 51 from the side. In this way, as illustrated in FIGS. 9A and 9B, the base end portion of the float arm 5 is held by the holding part 51, and the peripheral surface is locked by the claw part 67 of the locking part 53. Thus, the base end side of the float arm 5 is fixed to the holder 7.

Here, the projection amount of the holding projection 61 formed on the holding piece 57 of the holding part 51 is gradually increased as a distance from the lock hole 49 is increased. Therefore, when the float arm 5 is fitted into the holding groove 59, the holding piece 57 is gradually lifted from the side of the lock hole 49 by the float arm 5 rotated around the lock end 55 as a fulcrum. The holding projection 61 has a guide surface 63 formed of an inclined surface gradually inclined to the surface of the holder 7 toward the front side in the insertion direction of the float arm 5 into the holding groove 59. Therefore, when the float arm 5 is fitted into the holding groove 59, the guide surface 63 comes into contact with the float arm 5, whereby the holding piece 57 is smoothly lifted up. Thus, by rotating the float arm 5 with the lock end 55 as a fulcrum, the float arm 5 is easily fitted into the holding groove 59 of the holding part 51 with small force.

The locking part 53 has a cantilever flexible arm structure connected to a part of the edge of the holder 7 and extending along the edge of the holder 7. Further, the locking part 53 is elastically deformed to easily displace the claw part 67. Accordingly, when the float arm 5 is fitted into the holding groove 59 of the holding part 51, the locking part 53 of the cantilever flexible arm structure is smoothly elastically deformed, and the peripheral surface of the float arm 5 fitted into the holding groove 59 is locked by the claw part 67.

Figure 10:
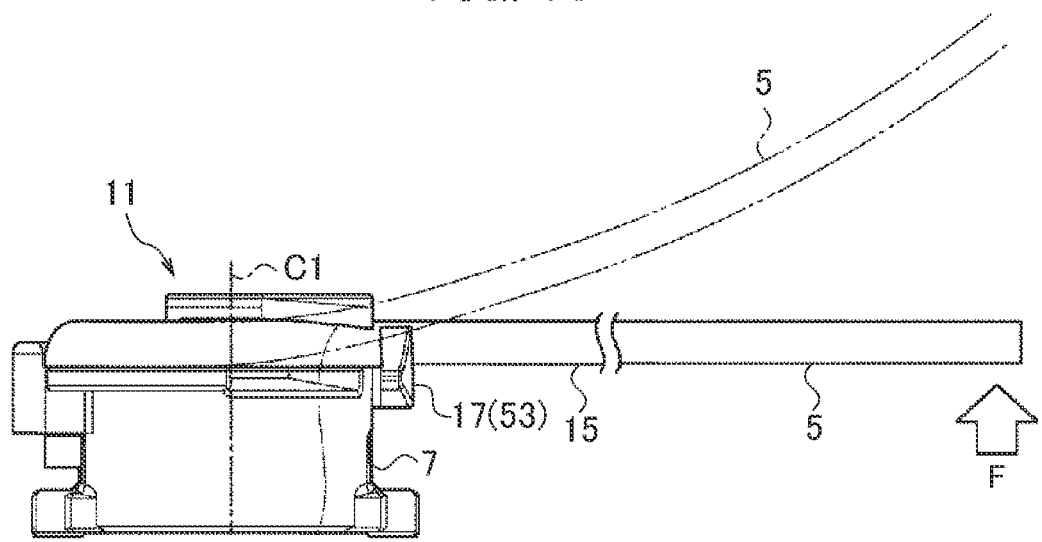
FIG. 10 is a side view 10 (corresponding to FIG. 9B) illustrating a state in which a load is applied to a float arm in a direction crossing a swing direction in the liquid level detector of FIG. 1 according to some embodiments.

As illustrated in FIG. 10, a load F may be applied to the float arm 5 held by the holder 7, for example, in a direction where the float arm 5 comes into contact with a surrounding member and crosses the swing direction of the float arm 5 at the time of assembling. When such a load F is applied to the float arm 5, a displacement amount of the float arm 5 gradually increases toward the tip side, as illustrated by a dashed-and-double dotted line in FIG. 10.

The liquid level detector 1 according to the embodiments of this disclosure includes the holding projection 61, whose projection amount gradually increased as distance from the lock hole 49 increased, at the tip side of the float arm 5 with respect to the rotation center axis C1 of the holder 7 at the edge part of the holding piece 57 of the holding part 51. Therefore, even if the load F is applied in a direction crossing the swing direction of the float arm 5 and the holding piece 57 is lifted, the float arm 5 is prevented from coming out of the holding groove 59 of the holding piece 57.

In the liquid level detector 1, the holding part 51 has the holding projection 61 having the holding surface 65 formed of an inclined surface gradually inclined to the surface side of the holder 7 toward the opening side of the holding groove 59 on the edge part of the holding piece 57. Therefore, even if the load F is applied in a direction crossing the swing direction of the float arm 5 and the holding piece 57 is lifted, an inclination angle of the holding surface 65 with respect to an inclination angle of the surface of the holder 7 does not easily incline to an opening angle in which angle the float arm 5 may come off from the holder 7. Therefore, the float arm 5 locked to the claw part 67 of the locking part 53 is further restrained from coming off from the holding groove 59.

In the liquid level detector 1 according to the embodiments of this disclosure, the float arm 5 is fitted into the holding groove 59 of the holding part 51 by rotating the float arm 5 with the lock end 55 inserted into the lock hole 49 as a fulcrum. Thus, the float arm 5 may be locked by the holding projection 61 of the holding piece 57 and the claw part 67 of the locking part 53 and fixed to the holder 7.

Here, the amount of protrusion of the holding projection 61 formed on the holding piece 57 of the holding part 51 is gradually increased as a distance from the lock hole 49 is increased. That is, when the load F is applied in a direction crossing the swing direction of the float arm 5, the projection amount of the holding projection 61 is gradually increased toward the direction in which the displacement of the float arm 5 is increased. Thus, when the load F is applied to the float arm 5 in a direction crossing the swing direction, the float arm 5 can be prevented from coming off from the holding groove 59.

Further, the amount of protrusion of the holding projection 61 is gradually increased as a distance from the lock hole 49 is increased. By this configuration, when the float arm 5 is fitted into the holding groove 59, the float arm 5 is fit into the holding groove 59 from the lock hole 49 side without difficulty. Therefore, by turning the float arm 5 with the lock end 55 inserted into the lock hole 49 as a fulcrum, the float arm 5 can be easily held by the holding part 51 with small force.

The holding projection 61 has the holding surface 65 inclined to the surface side of the holder 7 toward the opening side of the holding groove 59. Therefore, even if the load F is applied in a direction crossing the swing direction of the float arm 5 and the holding piece 57 is deformed, an inclination angle of the holding surface 65 with respect to an inclination angle of the surface of the holder 7 does not easily incline to an opening angle in which angle the float arm 5 may come off from the holder 7. Therefore, the float arm 5 can be further restrained from coming off from the holding groove 59.

The locking part 53 has a cantilever flexible arm structure extended from the holder 7. Therefore, when the float arm 5 fitted into the holding groove 59 comes into contact, the locking part 53 may easily bent. Since the locking part 53 has a cantilever flexible arm structure, the float arm 5 can be easily fitted into the holding groove 59 with a small force and be held by the holding part 51.

The elastic deformation preventing part 13 will now be described in more detail. The elastic deformation preventing part 13 is formed in an arcuate columnar shape. A cross-sectional shape orthogonal to an extending direction of an arc shaped center of the elastic deformation preventing part 13 is rectangular. More specifically, the elastic deformation preventing part 13 draws a rectangle of a predetermined plane, and is formed in a three-dimensional shape represented by the locus of the rectangle when the rectangle is rotated by a predetermined angle around the rotation axis. Here, the predetermined angle to be rotated is, for example, 20°. The rotation axis is separated from the rectangle by a predetermined distance and extends parallel to one of the four sides of the rectangle. Further, the frame 3 is provided with an elastic deformation preventing part 13 so that the rotation axis coincides with the rotation center axis C1 of the holder 7 (or the float arm 5). The elastic deformation preventing part 13 is integrally formed with the frame 3.

The elastic deformation preventing part 13 projects from the inner surface of the rotatably-accommodating recess 39 toward the rotation center axis C1 of the holder 7 (or the float arm 5). As illustrated in FIG. 6 and the like, when viewed in the extending direction of the rotation center axis C1, the elastic deformation preventing parts 13 are provided at two positions. Positions of the elastic deformation preventing parts 13 provided at the two positions in the extending direction of the rotation center axis C1 coincide with each other. The position of the snap-fit claw 17 in the normal state in the extending direction of the rotation center axis C1 is arranged at a position not interfering with the elastic deformation preventing part 13. That is, in the normal use state in which the rotation moment as indicated by the arrow in FIG. 14 is not applied to the float arm 5, the elastic deformation preventing part 13 and the snap-fit claw 17 are separated from each other in the extending direction of the rotation center axis C1, so that they do not interfere with each other.

As illustrated in FIG. 1, the liquid level detector 1 is installed in a fuel tank (not illustrated) in a state in which the center axis of the float arm 5 is at a position indicated by the dashed-and-dotted line L4 in FIG. 6. At this time, even if the float 9 hits an opening edge of the fuel tank and a rotational moment as indicated by an arrow in FIG. 14 is applied to the float arm 5, the snap-fit claw 17 abuts with the elastic deformation preventing part 13. Thus, the deformation of the snap-fit claw 17 is suppressed, and the float arm 5 is prevented from coming off from the float arm mounting part 11.

When the liquid level detector 1 is installed into the fuel tank, an abnormally large force would not be applied to the float arm 5 or the float 9. Thus, even if the center axis of the float arm 5 is located within the range of the angle θ3 illustrated in FIG. 6, the float arm 5 does not come off from the float arm mounting part 11.

When replacing the float arm 5 of the liquid level detector 1, the liquid level detector 1 is taken out of the fuel tank. Thereafter, if the center axis of the float arm 5 is positioned within the range of the angle θ3 illustrated in FIG. 6, the float arm 5 can be easily removed from the holder 7 and the float arm 5 can be easily mounted to the holder 7.

The liquid level detector 1 is provided with an elastic deformation preventing part 13 configured to prevent elastic deformation of a part of a float arm mounting part 11. As a result, it is possible to prevent the device from becoming large in size or increasing the number of parts of the device, and may improve the holding strength of the float arm 5 by the holder 7.

That is, although the strength can be improved by strengthening the snap-fit claw 17, the size of the device is increased and the assembling property of the float arm 5 to the holder 7 may be deteriorated. Further, if a separate component for preventing the elastic deformation of the snap-fit claw 17 is provided, the number of components of the device increases. On the other hand, in the liquid level detector 1, since the elastic deformation preventing part 13 is integrally provided on the frame 3, the device is prevented from becoming large or the number of components of the device is prevented from increasing, and further, the holding strength of the float arm 5 by the holder 7 may be improved.

In the liquid level detector without the elastic deformation preventing part 13 of the embodiment, when the rotational moment indicated by an arrow in FIG. 14 is applied to the float arm 5, the snap-fit claw 17 may cause elastic deformation as indicated by a dashed-and-double dotted line in FIG. 14, and the float arm 5 may come off from the holder 7.

In the liquid level detector 1 of the embodiments in this disclosure, the elastic deformation preventing part 13 prevents elastic deformation of a part of the float arm mounting part 11 only when the rotation angle of the holder 7 with respect to the frame 3 is within the predetermined rotation angle ranges θ1, θ2. Thus, the float arm 5 can be mounted onto the holder 7 in a state the holder 7 is mounted on the frame 3.

Regardless of the rotation angle of the holder 7 with respect to the frame 3, the elastic deformation preventing part 13 may be configured to prevent elastic deformation of a part of the float arm mounting part 11. In this case, the holder 7 may be mounted on the frame 3 after the holder 7 is mounted on the float arm 5.

In the liquid level detector 1, a predetermined rotation angle range for preventing elastic deformation of a part of a float arm mounting part 11 is a rotation angle range θ1 and a rotation angle range θ2 excluding a rotation angle range θ3 when the float arm 5 is mounted on a holder 7. Thus, elastic deformation of a part of the float arm mounting part 11 can be more accurately prevented, and the float arm 5 mounted on the holder 7 cannot be easily removed from the holder 7.

In the liquid level detector 1, predetermined rotation angle ranges θ1, θ2 configured to prevent elastic deformation of a part of a float arm mounting part 11 are angle ranges when a frame 3 (liquid level detector 1) is assembled to the fuel tank which is a liquid level detection object. This prevents the float arm 5 from coming off from the float arm mounting part 11 even if an excessive load is applied to the float arm mounting part 11 by, for example, accidentally hitting the float 9 to the fuel tank when the liquid level detector 1 is installed in the fuel tank.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid level detector comprising:
   a frame;
   a float arm;
   a holder rotatably supported by the frame, the holder comprising a float arm mounting part configured to mount the float arm to the holder by elastically deforming a first part of the float arm mounting part when mounting the float arm to the holder and restoring the first part of the float arm mounting part when float arm is mounted to the holder;
   a float mounted to the float arm to be apart from the holder; and
   an elastic-deformation-preventing part formed on the frame and configured to prevent elastic deformation of the first part of the float arm mounting part.

2. The liquid level detector according to claim 1, wherein the elastic-deformation-preventing part is configured to prevent elastic deformation of the first part of the float arm mounting part when a rotation angle of the holder with respect to the frame is within a predetermined rotation angle range.

3. The liquid level detector according to claim 2, wherein the predetermined rotation angle range is a rotation angle range excluding a mountable rotation angle range for the float arm onto the holder.

* * * * *